United States Patent [19]

Lavender

[11] 4,110,220
[45] Aug. 29, 1978

[54] MASS TRANSFER DEVICE

[76] Inventor: Ardis R. Lavender, 6 Starlight Dr., Clarks Summit, Pa. 18411

[21] Appl. No.: 733,445

[22] Filed: Oct. 18, 1976

[51] Int. Cl.² .................................................. B01D 13/00
[52] U.S. Cl. ................................ 210/321 R; 210/456; 210/321 A; 210/321 B
[58] Field of Search ........... 210/321 B, 321 A, 321 R, 210/456

[56] References Cited

U.S. PATENT DOCUMENTS

| | | | |
|---|---|---|---|
| 3,074,559 | 1/1963 | Savino | 210/321 B |
| 3,511,381 | 5/1970 | Alwall et al. | 210/321 B |
| 3,516,548 | 6/1970 | Alwall et al. | 210/321 B |
| 3,852,198 | 12/1974 | Murakami | 210/456 |
| 3,920,555 | 11/1975 | Johansson | 210/321 A |

Primary Examiner—Thomas G. Wyse
Assistant Examiner—David R. Sadowski

Attorney, Agent, or Firm—Vogel, Dithmar, Stotland, Stratman & Levy

[57] ABSTRACT

A mass transfer device consists of a stack of alternating plates and membranes in which each plate includes on each surface two manifolds for distributing and collecting fluid transversely of the plate. Headers interconnect the stack with the plate manifold fluid inlets and outlets to distribute and collect fluid uniformly to and from each plate. Inlet and outlet manifold channels of each plate surface are connected by channels formed in the central portion of the plate. Mass transfer occurs across the membrane supported between adjacent plates with a first fluid on one side and a second fluid on the other side. Substantially uniform inter- and intra- plate fluid distribution and thin fluid films enhance mass transfer. The device, with slight alterations appropriate to the application, is useful for dialysis, hemodialysis, blood oxygenation, reverse osmosis, heat exchange, or gas scrubbing.

21 Claims, 7 Drawing Figures

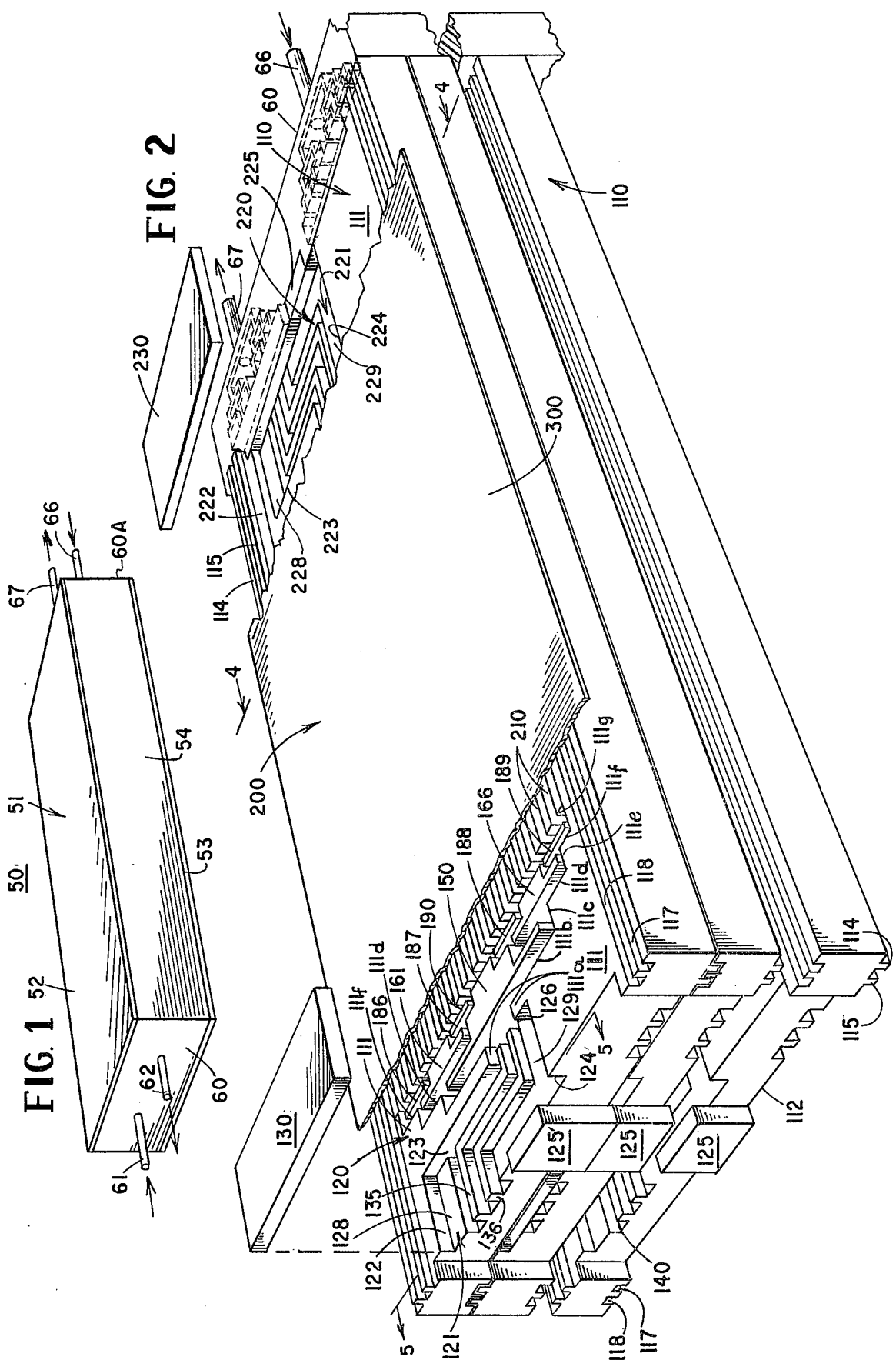

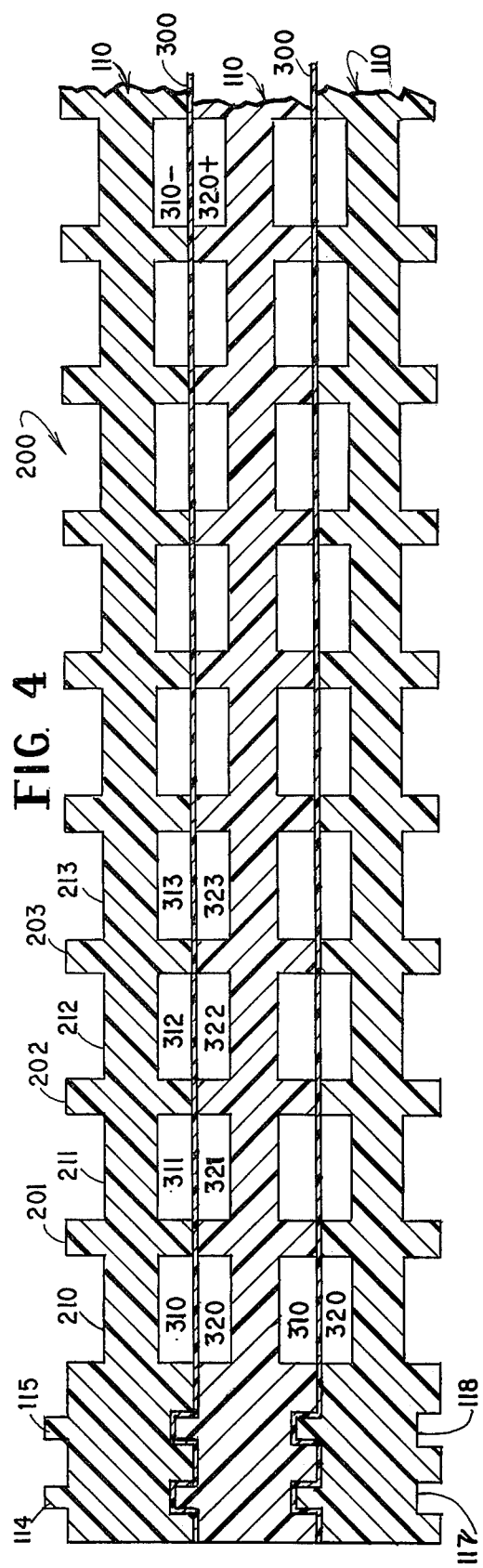
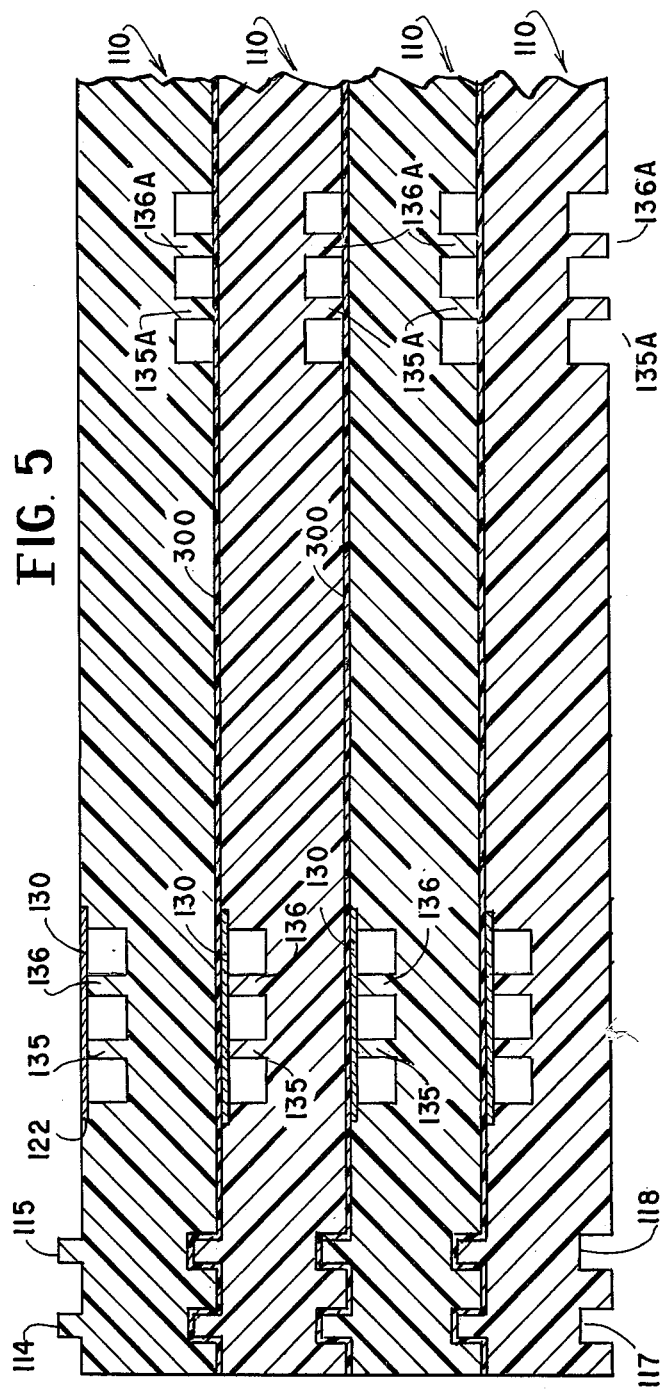

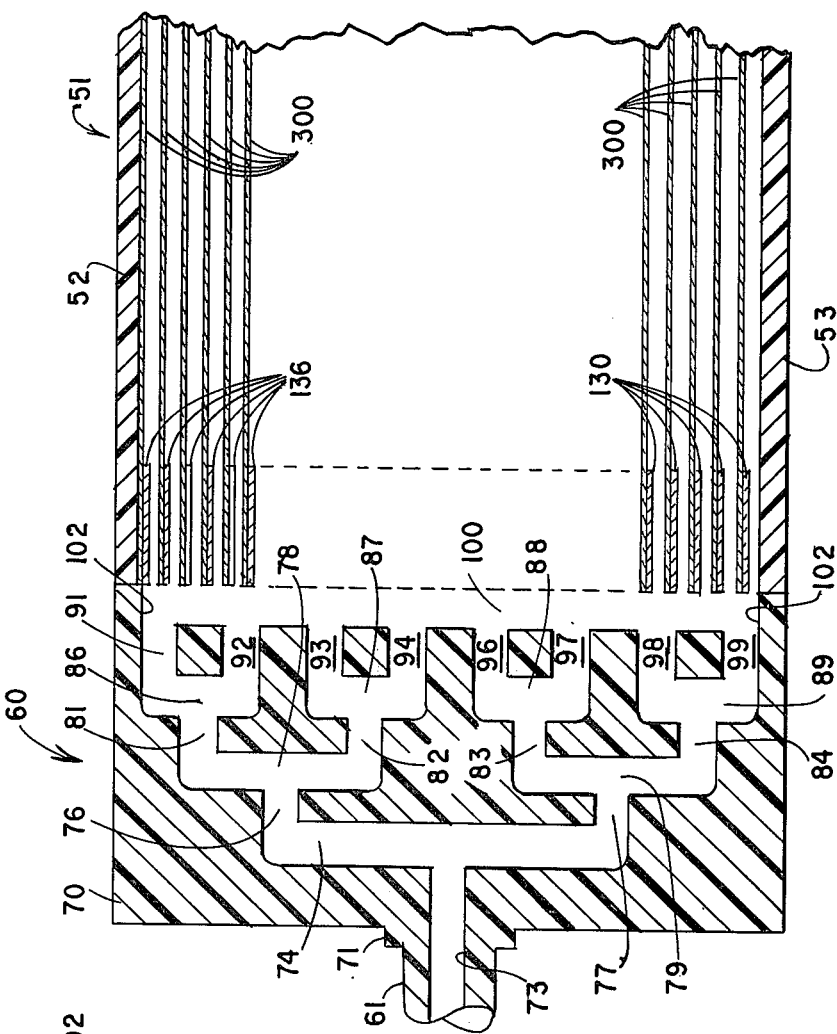
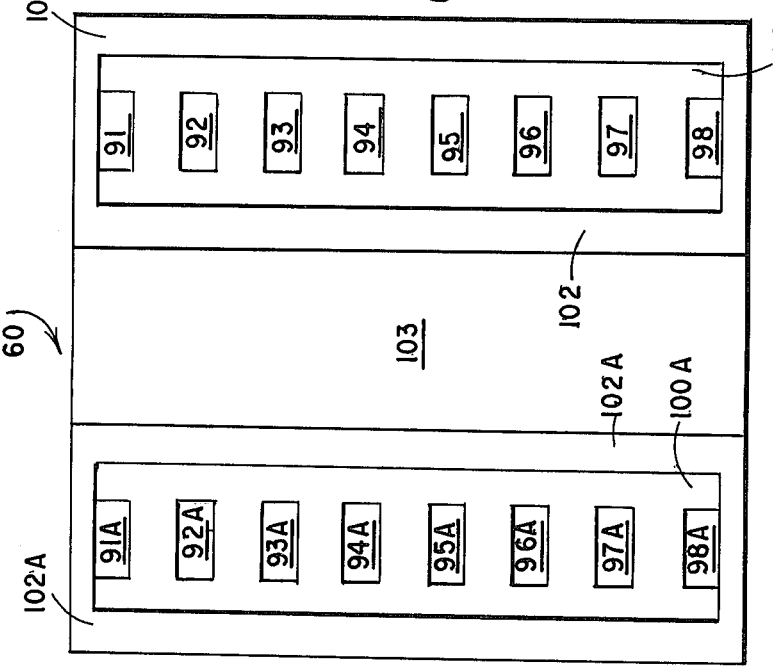

MASS TRANSFER DEVICE

BACKGROUND OF THE INVENTION

Mass transfer, whether it be dialysis, oxygenation, desalination, or heat exchange, is basically a surface phenomenon between two fluids and the transfer barrier there between. Inefficiency occurs in mass transfer devices due to poor transfer media, non-turbulent fluid flow, poor mixing, poor surface contact between fluids and the transfer barrier and non-uniform distribution of fluid on one or both sides of the transfer barrier. In multiple layer devices, non-uniform distribution among layers impairs efficiency. In general, most mass transfer devices are designed to minimize the enumerated factors in order to maximize mass transfer. Depending upon the mass transfer involved, trade-offs are required to achieve the desired effect.

Some uses for mass transfer devices are as dialyzers to effect solute and solvent transfers between dialysands and dialysate; as hemodialyzers to effect solute and water transfer between blood and dialysate; as oxygenators to effect carbon dioxide, oxygen, and nitrogen transfers between blood and oxygen containing gases; as heat exchangers to effect heat transfer between fluids such as in automobile radiators, in refrigeration units, in room heating units, and in solar heating devices; as reverse osmosis devices in which pressure gradients serve as the driving force to separate solute and solvent, as in desalination of water; and as filtration devices in which pressure gradients are used to separate solids and liquids. Each of these mass transfer devices has its peculiar needs; however, certain characteristics are desirable in all devices. Desirable characteristics include: (1) High mass transfer coefficients, which in turn require thin fluid films, uniform fluid distribution, good mixing of fluids, and high flux transfer membranes; (2) Adjustable flow pressure gradients; (3) Adjustable transmembrane pressure gradients, in the case of dialyzers and filtration devices; and (4) Compactness of design. In certain uses, such as hemodialyzers and blood oxygenators, perfect fluid channel seals are essential, since leaks could be fatal.

In both of my prior art U.S. Pat. Nos. 3,522,885 and 3,565,258, respectively, issued on Aug. 4, 1970 and Feb. 23, 1971, I utilized parallel flow, mass transfer devices for hemodialysis. In both of those devices, solute transfer rates necessary to perform adequate hemodialysis within a reasonable period of time could not be obtained. The latter device also suffered a progressive decrease in solute transfer rate which was attributable to build-up of proteinaceous material on the blood side of the transfer membrane.

Inefficiency of these device was mistakenly attributed to design of the membrane support structure. However, several variations of membrane support design, substituting for the original netting, did not alter dialyzer efficiency. The reason for poor performance was identified as non-uniform flow distribution both between layers and within individual layers. Poor distribution was responsible for low mass transfer and proteinaceous build-up on the membranes. Maldistribution in turn was secondary to inadequate entry and exit manifolding on individual plates, to inadequate manifolding of plates in the stack, and to distortion of fluid channel dimensions by pressure differentials in the cross-flow design configuration.

The Alwell et al. U.S. Pat. No. 3,511,381, issued May 12, 1970, for DIALYSIS BLOOD DISTRIBUTION GROOVES, is representative of a type of dialyzer which uses two membranes between adjacent supports to provide a flow path for blood while dialysate flows between the membrane and the adjacent support. In this type of construction, both the dialysate and the blood are introduced in a direction normal to the fluid flow during mass transfer, whereby both the blood and the dialysate pass through apertures in the supports and membranes. This construction results in difficult sealing problems as well as making the device expensive to produce.

U.S. Pat. No. 3,547,271, issued to Edwards, Dec. 15, 1970, for MEMBRANE FLUID DIFFUSION EXCHANGE DEVICE, is representative of another type of mass transfer device, that is an oxygenator in which adjacent membranes provide one fluid channel and the other fluid channel is provided by a support and a membrane. The Edwards construction runs afoul of the same problem as the Alwell et al. construction with difficult sealing problems.

The Alwell et al. U.S. Pat. No. 3,516,548, issued June 23, 1970, for DIALYSIS MEANS HAVING SPACING DISKS WITH GRATINGS DISPLACED OR TWISTED IN RELATION TO EACH OTHER, recognizes that the fluid distribution devices of the previously discussed Alwell et al. patent are expensive and difficult to use, the U.S. Pat. No. 3,516,548 patent being directed toward a less expensive fluid distribution device. Nevertheless, the use of fluid distribution system wherein fluid passes through apertures in membranes and supports is frought with possibilities of leakage and is expensive to manufacture.

The Esmond U.S. Pat. No. 3,738,495, issued June 12, 1973, for EXCHANGE DEVICE, illustrates another critical defect in the prior art. In the Esmond device, each cover plate has a manifold for distributing fluids and each flow plate has a manifold for distributing fluids, but the manifold designs make even flow distribution difficult to achieve.

Many of the prior art devices direct fluid entry and exit through holes pierced in the membranes and supporting structure. Membrane piercing increases handling and construction costs and increases the possibility of leakage during operation. Still others of these devices require that the two fluids be distributed along non-identical paths, whereby most of the thin film contact area is lost. Still other of these devices do not provides adequate fluid manifolding, whereby fluid distribution is insufficient to achieve proper mass transfer rates. Some of these devices require large fluid priming volume which is undesirable in certain mass transfer operations such as dialysis. Others of these devices are not readily adaptable to provide either small or large pressure drops across the device or variable pressure drops, and no prior art device known can easily accommodate all of these requirements. Finally, some prior art devices simply do not provide the requisite surface area for the fluids to contact in order to accomplish the desired mass transfer rate.

In short flow path mass transfer devices, entrance and exit effects predominate and these effects must be precisely controlled to provide uniform fluid flow to each plate and along each plate. There are two distinct problems, one being to provide uniform fluid distribution to each plate in a stack of plates and the other being to provide uniform fluid distribution across and along each plate. Heretofore, it has been assumed by investigators in short flow path mass transfer devices that membrane support design was critical, but, I have found that entrance and exit effects predominate and are much more critical. It is the flow distribution and thin boundary layers which primarily determine the extent of mass transfer, and in short parallel path devices the entrance and exit effects control the flow distribution.

By providing unique headers, fluid distribution to and from each plate is uniform and by providing unique plate manifolds, uniform fluid distribution along each plate is attained. The particular design provides maximum membrane support resulting in high burst strength for the membrane, an important feature in dialyzer or oxygenator designs. Also, internal resistance to fluid flow is a design parameter which can be altered to provide a wide range of pressure drops across the device, large pressure drops for reverse osmosis and low pressure drops for dialyzers.

SUMMARY

This invention relates to a mass transfer device and more particularly to a short path, parallel flow mass transfer device.

It is an important object of the present invention to provide a mass transfer device for effecting mass transfer between first and second fluids wherein the fluid flow paths are substantially identical and alternate layers of membranes and supports cooperate to establish the fluid flow channels.

Another object of the present invention is to provide a parallel flow device of the type set forth comprising a first fluid inlet and outlet and a second fluid inlet and outlet, a plurality of plates forming a stack, a membrane positioned between adjacent plates and cooperating therewith to form on opposite sides of each membrane a first fluid channel and a second fluid channel, the membranes being effective to permit mass transfer between a first fluid in the first fluid channels and a second fluid in the second fluid channels, means interconnecting the first fluid inlet in one end of the first fluid channel for introducing first fluid uniformly into the channels, means interconnecting the first fluid outlet in the other end of the first fluid channels for removing first fluid uniformly from the channels, means interconnecting the second fluid inlet and one end of the second fluid channels for introducing a second fluid uniformly into the channels and means interconnecting the second fluid outlet and the other end of the second fluid channels for uniformly removing second fluid from the channels.

Still another object of the present invention is to provide a parallel flow device of the type set forth wherein header means interconnect the first fluid inlet and the first fluid channels and interconnect the second fluid inlet and the second fluid channels to distribute fluid uniformly from said inlets to said plates and to collect fluid uniformly from said plates.

Still another object of the present invention is to provide a parallel flow device of the type set forth wherein each of the first and second fluid channels includes spaced apart inlet and outlet manifolds near the ends of the plates respectively interconnected by a plurality of first fluid paths and second fluid paths.

A further object of the present invention is to provide a parallel flow dialyzer for effecting mass transfer between human blood and a dialysate solution in which a semipermeable membrane positioned between adjacent plates and cooperating therewith respectively forms on opposite sides of each membrane a blood channel and a dialysate channel, the semipermeable membranes being effective to permit transfer of impurities in the blood to the dialysate.

A still further object of the present invention is to provide a plate for use in a parallel flow device for effecting mass transfer between first and second fluids, the plate comprising a flat member having opposed surfaces, one surface providing a continuous fluid flow path from one end thereof to the other end thereof for a fluid entering the flow path at the one end and exiting the flow path at the other end thereof, each of the fluid flow paths having an inlet manifold at one end and an outlet manifold at the other end, the inlet manifolds receiving fluid flowing parallel to the plate side edges and distributing the fluid transversely of the plate substantially from one side edge to the other side edge, the outlet manifolds collecting fluid flowing parallel to the plate side edges from substantially one side edge to the other, each of the fluid flow paths having a plurality of membrane supports intermediate the associated inlet manifold and the outlet manifold.

Another object of this invention is to provide a parallel flow dialyzer for effecting mass transfer between human blood and a dialysate solution, the dialyzer comprising a blood inlet and outlet and a dialysate inlet and outlet, each of the inlets and outlets being positioned at the ends of the dialyzer with the blood inlet and the dialysate outlet being at one end and the dialysate inlet and the blood outlet being at the other end, a plurality of rectangular flat plates forming a stack with each of the plates having grooves manifolds on both surfaces thereof at each end thereof providing four manifolds on each plate, each manifold providing fluid communication between the adjacent end edge of the plate and the central portion of the plate such that a single fluid stream at one end of the manifold at the end edge of the plate is distributed into a plurality of fluid streams at the other end of the manifold with flow resistance in the manifold being identical for any fluid path therein from the one end to the other end of the manifold, a plurality of grooves on both surfaces of each plate extending between the other ends of the manifolds to provide fluid communication between the end edges on each surface of each plate, a semipermeable membrane positioned between adjacent plates and cooperating therewith to form respectively on opposite sides of each membrane a blood channel and a dialysate channel, the semipermeable membranes being effective to permit transfer of impurities in the blood to the dialysate, header means interconnecting the blood inlet with half of the plate manifolds in fluid connection with the blood channels for uniformly distributing blood from the blood inlet to each of the connected plate manifolds, header means interconnecting the blood outlet with the other half of the plate manifolds in fluid connection with the blood channels for uniformly collecting blood from each of the connected plate manifolds, header means interconnecting the dialysate inlet with half of the plate manifolds in fluid connection with the dialysate channels for uniformly distributing dialysate from the dialysate inlet to each of the connected plate manifolds, header means interconnecting the dialysate outlet with the other half of the plate manifolds in fluid connection with the dialysate channels for uniformly collecting dialysate from each of the connected plate manifolds, and means for securely clamping the stack of plates and membranes positioned therebetween and for maintaining separate the blood channels with the associated inlet and outlet from the dialysate channels and the associated inlet and outlet, whereby blood entering the blood inlet is uniformly distributed to each of said connected plate manifolds by the associated header and thereafter uniformly distributed across each plate by the associated manifold to flow along the plurality of grooves to be collected by the associated manifold at the other end of the blood channel and then to be collected by the connected header for removal through the blood outlet while dialysate entering the dialysate inlet is uniformly distributed to each of the connected plate manifolds by the associated header and thereafter uniformly distributed across each plate by the associated manifold to flow along the plurality of grooves to be collected by the associated manifold at the other end of the dialysate channel and then to be collected by the connected header for removal through the dialysate outlet, thereby providing uniform fluid flow for both blood and dialysate through each channel and across each plate resulting in transfer of impurities from the blood across the membranes to the dialysate.

These and other objects of the present invention may more readily be understood by reference to the accompanying disclosure and drawings in which:

BRIEF DESCRIPTION OF THE DRAWINGS

FIG. 1 is an orthogonal view showing the mass transfer housing with the first and second fluid inlet and outlet;

FIG. 2 is an enlarged and exploded perspective view showing several individual plates in registry forming a stack of plates with a membrane therebetween;

FIG. 4 is a view in section of the assembled stack of plates and membranes shown in FIG. 2 taken along the lines 4—4 thereof;

FIG. 5 is a view in section of the assembled stack of plates and membranes shown in FIG. 2 taken along the lines 5—5 thereof;

FIG. 6 is an end view of one of the headers shown in FIG. 3 taken along the lines 6—6 thereof; and FIG. 7 is a view in section of the header and end portion of the mass transfer device shown in FIG. 3 taken along the lines 7—7 thereof.

PREFERRED EMBODIMENT

Figure 3:
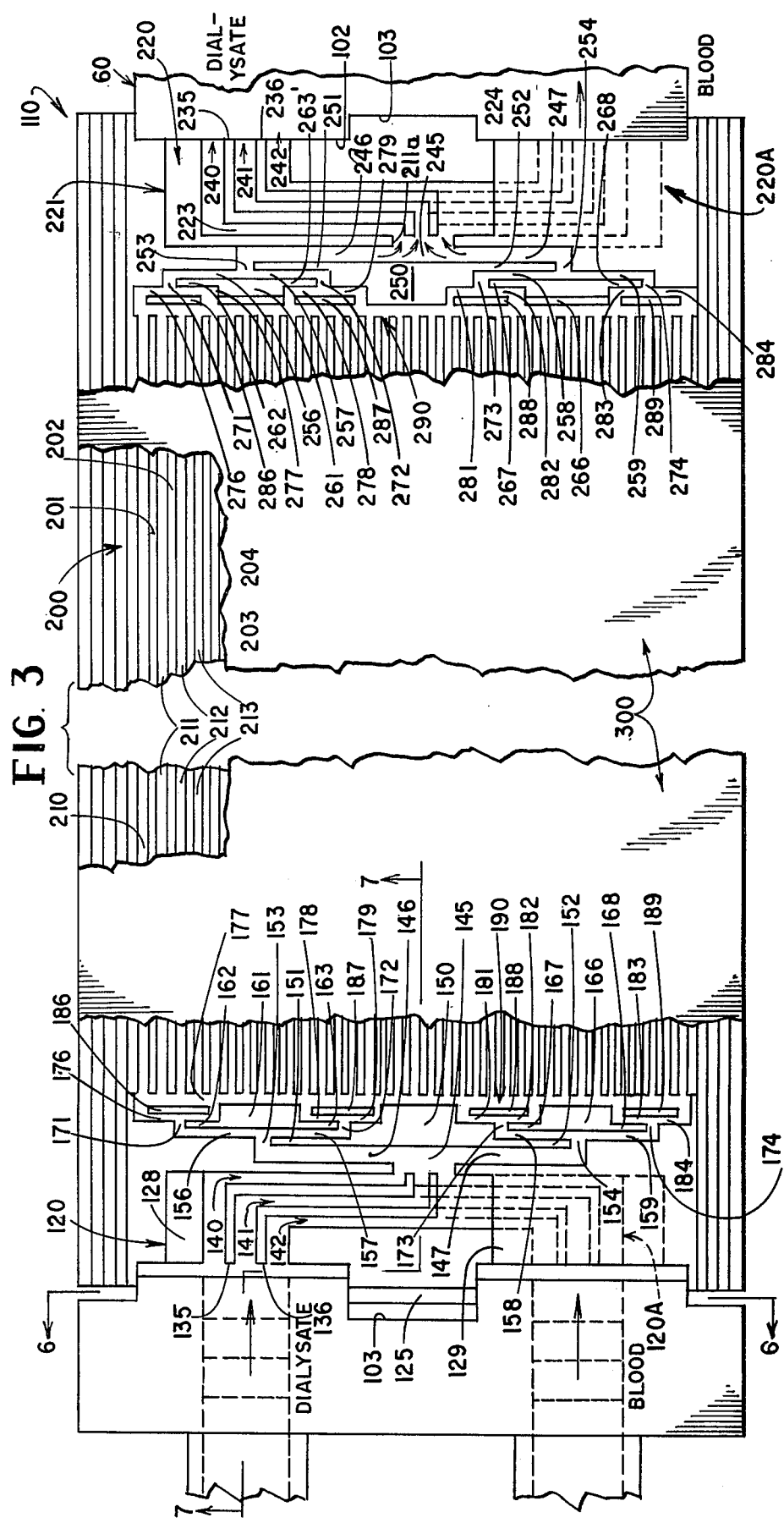
FIG. 3 is a plan view of a plate with the headers at both ends.

Referring now to the drawings, there is disclosed a mass transfer device 50 comprised of a stack of plates 110 each separated by a membrane 300 surrounded by a housing 51 having a top 52 and a bottom 53 joined by sides 54. The housing 51 is closed at each end by headers 60 and 60A, the header 60 having a fluid inlet 61 and outlet 62 and the header 60A having a fluid inlet 66 and outlet 67.

Each of the headers 60 and 60A is identical in construction and includes a body 70 which may be made of any suitable material and which includes aligned fluid inlets or outlets 61 and 62. A flange 71 may be molded on the body 70 or may be used to provide a surface for securing the inlet 61 or outlet 62 to the body. Fluid communication is provided by a central passage way 73 which extends through the inlet 61 into a first branch 74. The branch 74 is perpendicular to the passage way 73 and is bisected thereby with the ends of the branch 74 terminating in legs 76 and 77 which are perpendicular to the branch 74 and parallel to the passage way 73. The length of the legs 76 and 77 are identical, and each leads to a second branch 78 and 79 respectively, which branches 78 and 79 are perpendicular to the legs 76 and 77 and parallel to the first branch 74. The legs 76 and 77 respectively, bisect the branches 78 and 79 each of which terminates in legs 81 and 82 for the branch 78 and legs 83 and 84 for the branch 79. Each of legs 81 through 84 again branch such that the leg 81 leads to a branch 86, the leg 82 leads to a branch 87, the leg 83 leads to a branch 88 and the leg 84 leads to a branch 89, again each of the legs bisect the respective branch. The branch 86 splits to two legs 91 and 92; the branch 87 splits into two legs 93 and 94; the branch 88 splits to two legs 96 and 97; and the branch 89 splits to two legs 98 and 99.

Each of the aforementioned legs, then opens into a common header plenum 100, which plenum extends substantially the entire length of the header 60, and is coextensive with the stack of plates 110, and is framed by a rectangular ledge 102. The header 60 accommodates inlets 61 and 62, whereby two header plena 100 and 100A must be provided. As seen from FIG. 6 of the drawings, side-by-side header plena 100 and 100A are separated by a recessed area 103 intermediate the framing ledges 102 and 102A. Each of the header plena 100 and 100A are in communication with eight openings or legs 91 through 99 and 91A through 99A, respectively. It is absolutely critical and fundamental to the operation of the header 60 and the mass transfer device 50 that the length of the flow paths for all fluid entering and exiting through the inlets or outlets 61, 66 and 62, 67 are identical for all fluid between the plena 100 or 100A and the associated inlet or outlet 61, 66, 62, 67 whereby the flow resistance is the same, since all paths have the same diameter at all points in the header plena 100 and 100A and all path lengths are identical, the flow resistance is uniformly equal, and hence, fluid distribution is even and uniform throughout the plena. Since flow velocity uniformly and progressively decreases as fluid flows from inlets 61 or 66 to legs 91 through 99 and into header plenum 100, there is no jetting effect, and each plate 110 in the stack receives an identical amount of fluid from the inlets 61 and 66. Similarly, fluid leaves each plate 110 to enter plenum 100 and pass through legs of header 60 to outlets 62 and 67. Since flow velocity in the header 60 increases uniformly and progressively, each plate 110 in the stack delivers an identical amount of fluid to the outlets 62 and 67.

The mass transfer device 50 includes a plurality of plates 110 arranged in stack configuration. Since each plate 110 is identical in construction, only one such plate will be described. It is understood that the endmost plates 110 in the stack have only one surface provided with the hereinafter described design, the outer surface being smooth for bonding to the top 52 and bottom 53 of the housing 51. Each of the plates 110 is rectangular in shape and has opposed surfaces 111 and 112, which for the sake of convenience will be referred to as the upper surface 111 and the lower surface 112, it being understood that the stack can be positioned in any orientation in use. Along the longitudinal peripheral edges there are spaced apart tongues 114, 115 at one side edge of the upper surface 111 and spaced apart grooves 117, 118 at the other side edge of the upper surface, the grooves 117, 118 extending longitudinally of the plate 110 and being constructed and arranged to receive therein the tongues 114, 115. As seem from the drawings, the side of the plate 110 which has the longitudinally extending tongues 114, 115 on the upper surface 111 is provided with grooves 117, 118 on the bottom surface 112, the grooves being in registry with the tongues. Similarly, on the side of the plate 110 which is provided with the longitudinally extending grooves 117, 118 on the upper surface 111, there is provided in registry therewith on the bottom surface 112, longitudinally extending tongues 114, 115. This configuration enables the plates 110 to be stacked as shown in the drawings without regard to which side is "up" or "down".

Each of the plates 110 is provided with four manifolds, manifolds 120 and 220 on the upper surface 111 and manifolds 120A and 220A on lower surface 112. The plate manifolds distribute fluid transversely of the plate from where the fluid is introduced to the plate at the end edge to the mass transfer area 200 at the central portion of the plate where membrane supports are provided and mass transfer can occur across the supported membranes. Since the geometry of one surface is the mirror image of the other surface, the description will be limited to the manifolds 120 and 220 on the upper surface 111. For some uses, such as dialyzers, the surfaces are preferably mirror images, as illustrated, but for other uses, such as heat exchangers, the surfaces preferably are identical, both embodiments are intended to be included in this invention.

The manifold 120 includes a recess 121 defined by the walls 122, 123, 124 and 126, the walls 122 and 123 being contiguous and separated from the walls 124 and 126. The surface 111 has a center opening defined by the edge 111a. The opening in the surface 111 then extends outwardly toward the respective longitudinal edge of plate 110 in a series of stepped edges 111b, 111c, 111d, 111e, 111f and 111g. The lengths of the edges 111a are identical as are the surfaces 111b etc., whereby to make the opening defined by the edges 111a–111g symmetrical about the opening defined by the edges 111a.

A shoulder 128 extends outwardly from the walls 122 and 123 and a shoulder 129 extends outwardly from the walls 124 and 126. The end surface of the manifold 120 is recessed inwardly between the end surfaces of the tongues 114, 115 and the grooves 117, 118. Intermediate the tongues 114, 115 and the grooves 117, 118 is a center bar 125, the center bar 125 having a thickness equal to the extension of the tongues and grooves beyond the end surface of the plate manifold 120, such that the outer surface of the center bar 125 lies in the same plane as the end surface of the tongues and grooves, the inset of the manifold 120 being for purposes hereinafter set forth. A rectangular shim 130 has a dimension such that it will fit securely in the recess 121 and abuts the walls 122, 123, 124 and 126. When resting on the shoulders 128 and 129, the top surface of the shim 130 lies in the same plane as the upper surface 111.

The shoulders 128 and 129 lie in the same plane and are separated by a cut-out portion which is divided by a plurality of partitions, shown for illustrative purposes as two partitions, 135 and 136. These partitions are shown as continuous, but it is to be understood that other configurations, such as cones, squares, or pyramids may serve the same purposes. The partitions 135 and 136 are parallel one to another and spaced apart with each partition being comprised of two parallel legs interconnected by a perpendicular leg. The partitions 135 and 136 cooperate with the adjacent shoulders 128 and 129 respectively, to form three fluid flow paths 140, 141 and 142, each of which leads from the end of manifold 120 toward the center of the plate 110 and terminates in a plenum 145 extending traversely of the plate and formed by the edges 111a. The number of paths 140–142 depends on the number of partitions, which is turn depend on the membrane strength, fluid pressure and other factors.

Fluid entering the plenum 145 will flow either along the path 146 or along the path 147, the paths being formed by the edges 111b in cooperation with a baffle 150, the baffle having a center portion and two outwardly extending wings 151 and 152 respectively, which are transverse with respect to the longitudinal extend of the plate 110. At the ends of the wings 151 and 152 are plena 153 and 154 respectively, and fluid flowing into the plenum 153 flows along paths 156 and 157 while fluid flowing through the plenum 154 flows along paths 158 and 159. Not shown in the drawings are continuations of the plurality of partitions, shown as 135 and 136, which may continue through the flow path defined by baffle 150 and edges 111a, 111b and 111c. It is understood that similar partitions may or may not extend through the flow paths of manifold 120, as described hereunder, according to the particular application of the invention.

Fluid from the plenum 153 is directed along the paths 156 and 157 by the baffle 161 which faces the plenum and has wings 162 and 163 respectively, extending outwardly therefrom parallel to the wing 151 of the baffle 150 and to the edge 111b. The fluid flow paths 158 and 159 are formed from the plenum 154 with the cooperation of a baffle 166 which includes outwardly extending wings 167 and 168, the wings 167 and 168 lying in the same traverse plane as the wings 162 and 163. Fluid flowing along the paths 156 and 157 respectively, enter plena 171 and 172 while fluid flowing along the paths 158 and 159 enter respectively the plena 173 and 174. Fluid in the plenum 171 divides into paths 176 and 177 defined by the baffle 186, the edge 111f and the wing 162; fluid from the plenum 172 divides into paths 178 and 179 defined by the baffle 187, the baffle 150 and the wing 163; fluid from the plenum 173 divides into paths 181 and 182 defined by the baffle 188 the baffle 150 and the wing 167; and fluid from the plenum 174 divides into paths 183 and 184 defined by the baffle 189, the edge 111f and the wing 168. Fluid flowing around the baffles 186, 161, 187, 150, 188, 166 and 189 respectively, enters the central distributing plenum 190. It is understood that the number of subdivisions in the flow paths of manifold 120 may be more or fewer than those shown for illustration, the requirement of the invention being progressive splitting of each flow path into two equal legs so that flow resistance is everywhere, at the same distance from inlets 61 or 66, identical and uniform.

The distributing plenum 190 extends transversely of the plate 110 across substantially the entire plate intermediate the tongues 114, 115 and the grooves 117, 118, it being noted that the depth of the plenum 190 extends from the upper surface 111 into the plate 110 to a depth which may be less than, equal to or greater than the vertical extent of the partitions 135 and 136, (the depth of plenum 190 determining the extent of pressure equalization therein, as will be explained), the upper surfaces of all the baffles lying in the plane defined by the upper surface 111, whereby a discontinuous flat surface is provided between the edges of the plate, so that the longitudinally extending tongues and the longitudinally extending grooves respectively, extend above and below this surface when the shim 130 is in place.

As will be appreciated, all of the fluid flow paths from the beginning of paths 140, 141 and 142 to the plenum 190 have identical lengths, widths and heights and hence present the same flow resistance. Accordingly, when the header 60 is mounted, as hereinafter set forth, fluid entering the header 60 through the inlet 61 will distribute in the plenum 190 uniformly across the entire length of the plenum because the flow resistance encountered by all the fluid in the plenum 190 will have been precisely the same. The uniform distribution of fluid in the plenum 190 is critical to the operation of the present invention. The height of the flow paths in the plate manifold 120 are predetermined depending on the desired flow resistance, the importance of which will be hereinafter set forth.

The mass transfer area 200, located in the central portion of each plate 110, is defined by the longitudinally extending tongues 114, 115 and the longitudinally extending grooves 117, 118 and by the transversely extending central distributing plenum 190 and a transversely extending central collecting plenum 290. The distance intermediate the plena 190 and 290 is the mass transfer area 200 and is divided by a plurality of membrane supports consisting of parallel spaced apart baffles 201, 202, 203, 204 ... 200 + n into a plurality of longitudinally extending flow paths 210, 211, 212 ... 210 + n. Each of the channels 210, 211 etc. so defined have the same height, width and length, whereby the flow resistance is the same for all of the channels. The upper surface of each of the baffles 201, 202 etc. lie in the same plane as all of the other baffles previously described, and in the plane defined by the surface 111 and the shim 130, whereby all of the baffle top surfaces and the shim provided membrane support. Fluid flow through the channels 210, 211 etc. will be uniform with all channels being filled and carrying the same amount of fluid at the same velocity.

Each of the plates 110 is provided with an outlet manifold 220 at the end of the plate opposite the inlet manifold 120, the manifolds being substantially the same construction although mirror images one of the other. Specifically, the manifold 220 includes a recess 221 defined by walls corresponding to walls 122, 123, 124, and 126. The recess 221 has branches therein 211a-g corresponding to like portions of manifold 120 and are numbered accordingly.

A shoulder 228 extends outwardly from the walls corresponding to walls 122 and 123 and a shoulder 229 extends outwardly from the wall corresponding to wall 124. The end surface of the manifold 220 is recessed inwardly between the end surfaces of the tongues 114, 115 and the grooves 117, 118. Intermediate the tongues 114, 115 and the grooves 117, 118 is a center bar 225, the center bar 225 having a thickness equal to the extension of the tongues ang grooves beyond the end surface of the plate manifold 220, such that the outer surface of the center bar 225 lies in the same plane as the end surface of the tongues and grooves, the inset of the manifold 220 being for purposes hereinafter set forth. A rectangular shim 230 has a dimension such that it fits securely in the recess 221 and abuts the walls 222, 223, 224 and 226. When resting on the shoulders 228 and 229 the top surface of the shim 230 lies in the same plane as the upper surface 211.

The shoulders 228 and 229 lie in the same plane and are separated by a cut-out portion which is divided by two partitions 235 and 236. The partitions 235 and 236 are parallel one to another and spaced apart with each partition being comprised of two parallel legs interconnected by a perpendicular leg. The two partitions 235 and 236 cooperate with the adjacent shoulders 228 and 229 respectively, to form three fluid flow paths 240, 241 and 242, each of which leads from the end of manifold 220 toward the center of the plate 110 and terminates in a plenum 245 extending traversely of the plate and formed by the edges 211a. Fluid entering the plenum 245 will flow either along the path 246 or along the path 247, the paths being formed by edges 211b in cooperation with the baffle 250, the baffle having a center portion and two outwardly extending wings 251 and 252 respectively, which are transverse with respect to the longitudinal extent of the plate 110. At the ends of the wings 251 and 252 are plena 253 and 254 respectively, and fluid flowing into the plenum 253 flows along paths 256 and 257 while fluid flowing through the plenum 254 flows along paths 258 and 259.

Fluid from the plenum 253 is directed along the paths 256 and 257 by the baffle 261 which faces the plenum and has wings 262 and 263 respectively, extending outwardly therefrom parallel to the wing 251 of the baffle 250 and to the edge 211b. The fluid flow paths 258 and 259 are formed from the plenum 254 with the cooperation of a baffle 266 which includes outwardly extending wings 267 and 268, the wings 267 and 268 lying in the same transverse plane as the wings 262 and 263. Fluid flowing along the paths 256 and 257 respectively, enter plena 271 and 272 while fluid flowing along the paths 258 and 259 enter respectively the plena 273 and 274. Fluid in the plenum 271 divides into paths 276 and 277 defined by the baffle 286, the edge 211f and the wing 262; fluid from the plenum 272 divides into paths 278 and 279 defined by the baffle 287, the baffle 250 and the wing 263; fluid from the plenum 273 divides into paths 281 and 282 defined by the baffle 288 the baffle 250 and the wing 267; and fluid from the plenum 274 divides into paths 283 and 284 defined by the baffle 289, the edge 211f and the wing 268. Fluid flowing around the baffles 286, 261, 287, 250, 288, 266 and 289 respectively, enters the central collecting plenum 290. It is understood that direction of fluid flow from or to manifolds 120 and 220 is arbitrary. If fluid enters 120, it leaves via 220. If it enters 220, it leaves via 120.

The collecting plenum 290 as hereinbefore set forth extends transversely of the plate 110 parallel to the distributing plenum 190. It is seen therefore, that the plena 190 and 290 form the longitudinal end boundaries of the mass transfer area 200 with the plurality of longitudinally extending channels 210 etc. formed by the baffles 201 etc. extending therebetween and bounded transversely by the longitudinally extending tongues 114, 115 and the grooves 117, 118.

A membrane 300 is positioned between adjacent plates 110 and extends from the end of the manifold 120 to the end of the manifold 220 and also extends across both of the spaced apart tongues 114, 115 and across both of the spaced apart grooves 117, 118. When the of plates 110 is arranged with a membrane 300 between each of the plates and the tongues 114, 115 of one plate 110 are forced into the respective mating grooves 117, 118 of another plate 110, the membranes 300 are maintained under tension and define with the adjacent plates fluid flow paths 310, 311, 312 etc. for a first fluid between the membrane 300 and the surface 111 of one plate and fluid flow paths 320, 321, 322, etc. for a second fluid between the membrane 300 and the surface 112 of the adjacent plate.

Accordingly, it is seen there is provided flow paths 310 etc. and 320 etc. for a first fluid and a second fluid respectively in which each fluid is present on one side of the membrane 300 and is directed along a flow path defined by the membrane and the configuration of the adjacent plate 110. Each plate 110 has either the same configuration on each surface or mirror image configurations on the surfaces, except that the membrane supports in the mass transfer area 200 define identical flow paths to ensure maximum area in which the first and second fluids are mass transfer relationships across the membrane 300. When the stack of plates 110 is formed, a header 60 or 60A is securely fastened to each end of the stack with the aligned center bars 125 forming a center post and aligned center bars 225 forming another center post, each of the center posts fitting into and mating with the recessed surfaces 103 on the headers 60 and 60A hereinbefore described.

Fluid entering the inlet 61 will be distributed by the header 60 to the plenum 100 to present a uniform distribution of fluid to each plate manifold 120 and in particular to each of the fluid flow paths 140, 141 and 142. Similarly, fluid entering the inlet 66 will be distributed by the header 60A to the plenum 100A to present a uniform distribution of fluid to each plate manifold 120A and in particular to each of the fluid flow paths 140A, 141A and 142A. The shims 130, 230 are used to prevent membrane deformation when the fluid entering the manifolds 120A is under greater pressure than that entering the manifolds 120. The shims 130, 230 are positioned in the recesses 121, 221 respectively, and the associated membrane 300 is positioned over the shim. Shims may be used in recesses 121A and 221A if desired. When the fluid entering the manifolds 120A is under greater pressure than the fluid entering the manifolds 120, no membrane deformation will occur, whereby leakage of fluid will be prevented between the manifolds 100A and 100. If the two fluids are at the same pressure then the shims 130, 230, are not necessary if the membrane is sufficiently stiff; otherwise, shims will be used in all recesses 121, 221, 121A and 221A. If membrane 300 is sufficiently stiff or if the channel spacings is close enough to prevent membrane deformation, then no shims 130, 230 are necessary.

Some of the principle advantages of the mass transfer device 50 are the even distribution provided for the first and second fluids by both the headers 60 and 60A as well as the individual plate manifolds 120 and 120A, 220 and 220A, thereby eliminating substantially all entrance and exit effects. The headers 60, 60A distribute and collect fluids in a direction normal to the plate 110 planes, whereas the manifolds 120, 220, 120A, 220A, distribute and collect fluids in the plate planes transversely of the plates 110. The combination of the headers 60, 60A and manifolds 120, 120A, 220, 220A, provides fluids to and from the plena 190 and 290 and to the mass transfer area 200 at low velocities and low turbulances, which assures even distribution of pressure and flow at entry and exit of fluids to and from flow channels in each plate 110. Fluids flow through the mass transfer area 200 uniformly without jetting effects to provide the maximum amount of fluids in contact with the membranes 300, resulting in vastly improved mass transfer. In addition, the fluid flow channels are relatively shallow so that the surface/volume ratio of fluids in contact with membrane surfaces is very high. Stated otherwise, very thin fluid films (as thin as 5 times the diameter of a red cell) reduce resistance to mass transfer and enhance efficiency of the invention. After fluid is distributed by means of the plate manifolds 120 and 120A flow in the mass transfer area 200 is longitudinal and uniform, whereby both the first and second fluids may flow at almost precisely the same speed since they both meet identical flow resistance. It is understood that in some applications, however, that depth of the flow channels on one side of plate 110 may be different than the depth on the other side. In this case flow resistance would be different on one side than the other.

Since both fluids are introduced into the mass transfer area 200 by fluid flow along the individual plates 110 and through the channels provided by the cooperation between the individual plate and the adjacent membrane 300, no gaskets or other mechanisms which may leak are necessary to distribute fluid along the individual plates. The present construction therefore, allows the membranes 300 to be generally imperforate, which in this context does not refer to the ability of the membrane to act as a filter, which may be the case in certain applications, but refers to the fact that the membrane need not be punctured since fluid is introduced longitudinally of the membrane rather than transversely through the membrane. Since individual sheets of membrane 300 are used between each of the individual plates 110, economy of material and ease of construction are provided over prior art configurations which use tubular or double membranes between supports.

A principal feature of the mass transfer device 50 of the present invention is the substantially uniform distribution provided for the first and second fluids by the headers 60, 60A and the individual plate manifolds 120, 120A, 220 and 220A. After the fluids have been distributed into the plena 100 and 100A, the flow thereafter is along rather than through or across the plates 110 and the membrane 300. This is particularly advantageous where leakage problems must be prevented.

In the short path parallel flow mass transfer device 50 herein illustrated, entry and exit effects could predominate. These effects are minimized in the present invention by the cooperation of the header 60 design which provides a uniform distribution of fluid to each layer and the plate manifolds 120, 220, 120A and 220A design which provides uniform distribution of the fluids between the layers. The fluids therefore proceed along the multiple parallel paths in a parabolic wave front with all paths carrying the same amount of fluid at the same velocity. If the flow velocity for the fluids in the mass transfer device 50 is very low, the Reynolds number is low enough such that turbulence is not a factor, whereby the flow distribution and thin boundary layers becomes the critical parameters of mass transfer.

The headers 60 and 60A split the incoming fluids until a uniform distribution is obtained in the plena 100 and 100A; no entry or exit jets are present and the header acts as a single source or sink for each fluid. The proper dimensions of the distribution system which includes both the headers 60, 60A and the the individual plate manifolds 120, etc. are critical to the design of the mass transfer device 50 and vary according to other dimensions of the design and the end use therefor. Similarly, the manifolds 120, etc. uniformly distribute the fluids to provide a sink or single source to the mass transfer area and particularly the plena 190, 290, whereby no jetting or uneven flow occurs transversely of the plates 110, either. By adjusting the depth of various flows channels, the internal resistance of all or parts of the device 50 can be altered according to application, to provide uniform or non-uniform high or low resistance.

The mass transfer device 50 of the present invention may be used as a parallel flow hemodialyzer. In such a use, 80 layers of membrane 300, such as regenerated cellulose, may be utilized in a device having an outside dimension including the housing 51 of 8.4 by 4.125 by 2.65 inches, with a finished weight of 2.9 lbs. The pressure drop across the dialyzer at a flow rate of 300 milliliters (ml) per minute would be 42 mm. Hg., while the mean transmembrane pressure in a fistual hook-up, would be 46 mm. Hg. The minimum ultrafiltration rate with a fistula system at 300 ml per minute blood flow would be 0.5 ml per minute, or 30 ml. per hour. The maxiumum ultrafiltration rate might be as great as 40 ml per minute, or 2400 ml per hour. This range of adjustable ultrafiltration rates exceeds that of current state-of-the art devices of 1 square meter membrane surface area, and enhances the clinical usefulness of the invention. An advantage of the transfer device 50 of the present invention is that a low priming volume of only 87 ml blood would be needed with an effective membrane area of 9,667 cm. or almost 1 square meter.

When used as a parallel flow hemodialyzer, the individual plates 110 may be made from any material which is biocompatible with blood and other body fluids. A synthetic organic resin, such as a thermoplastic, which molds at relatively low temperatures, may be used, or a thermoset may be used. These include polyesters, polyurethanes, polycarbonates or polystyrene. The membrane material may be any of the art recognized semipermeable membranes used in the dialyzer art such as regenerated cellulose, cellulose acetate, polycarbonate or any other semipermeable, non-toxic polymer membrane. The housing 51 and the header 60 must also be made out of a material which is biocompatible with blood and other body fluids, polycarbonate being one such material.

In the preferred hemodialyzer construction, each plate 110 of polypropylene is 0.03 thick and has mirror image patterns on each side thereof such that dialysate will enter the inlet 61 and exit the outlet 67 and blood will enter the inlet 66 and exit the outlet 62. The membranes 300 are preferably made of regenerated cellulose and the shims 130 and 230 are preferably a polyester synthetic organic resin. Accordingly, it is seen that both the dialysate channels 310, etc. and the blood channels 320, etc. are bounded by membrane 300 on one side and the respective plates 110 on the other side.

The baffles 201, etc. measure 0.01 inch across and are spaced apart 0.1 inch, the channels 210, etc. being 0.003 deep. The plate manifolds 120, 220 and 220A have channel depths greater than the 0.003. Specifically, the plate manifolds 120, 120A, 220 and 220A have a channel depth of about 0.006 in order to compensate for the reduced flow area in the manifolds as compared to the flow area provided by the channels 310, etc. and 320, etc. It is understood that the shape of the channels and baffles are illustrative and may be altered for engineering reasons.

Assembly of the mass transfer device 50 is facilitated by the tongues 114, 115 and grooves 117, 118 which insure registry of each of the individual plates 110 in the stack. The housing 51 may be adhesively secured with an epoxy resin or silicone rubber adhesive or any other suitable adhesive for use with body fluids. After the stack is secured in the housing 51, the headers 60 are attached with an appropriate adhesive or other means. Registry of the header 60 with the stack of individual plates 110 is assured by the center bars 125 and 225. Since each of the membranes 300 is stretched across the individual plates 110, and thereafter the plates are clamped together, the tongues 114, 115, and grooves 117, 118 cooperate to maintain the membranes 300 under tension, the membranes having a burst strength in the dialyzer of greater than 30 psi or 1,400 mm. Hg.

The mass transfer device 50 of the present invention may be also used as an oxygenator. In use as an oxygenator, the housing 51 would be a synthetic organic material which is biocompatible with blood and other body fluids, as required for dialyzer use. This would also apply to the headers 60 as well as the plates 110. The membranes 300 would be a silicone rubber polymer or a copolymer of silicone rubber and polycarbonate. Additional membranes may be made from extruded microporous materials such as produced by Gore-Tex or a microporous polypropylene produced by the Cellanese Corporation. Certain catalytic membranes are also acceptable for use in an oxygenator, and in particular, certain synthetic organic resins having a permanganate coating thereon are desirable.

The mass transfer device 50 may also be used for heat transfer, wherein the plates could be metal or any high-temperature resistant material, such as polypropylene, polycarbonate or thermo-setting resins, such as epoxies, resorcinals or urea formaldehydes. Membrane materials could be thin aluminum foil one half to one mil in thickness. One such application is an automobile radiator wherein the heat transfer rate required is 60,000 calories per second at a flow rate of 13 gallons per minute, and at a pressure drop of 2 lbs. per square inch. It is contemplated, for instance, that in an automobile radiator, coolant from the motor could be pumped on one side of the membrane 300 while air would be pumped through the other side of the membrane. The only motor requirement would be an air pump rather than the fans now in use.

Since the film thickness of the coolant in the heat transfer device 50 would be very thin, high heat transfer will occur. A 400 plate device will provide 10 square meters of surface area which is equivalent to present day automobile radiators. A 400 plate device constructed in accordance with the present invention would measure about 14 by 4 by 10 inches and have a volume of about 2 quarts of liquid. Accordingly, it is clear that an automobile radiator constructed in accordance with the present invention would be much smaller and more economical to manufacture than present day radiators.

The present invention can also be used in reverse from the automobile radiator described above, wherein the present invention will be useful as a heater. For instance, air can be used as one fluid and be blown through in heat exchange relationship with hot water. In this construction a simple air pump would be used to blow air through the mass transfer device thereby heating the air and thereafter introducing the heated air to the desired area.

The mass transfer device 50 of the present invention may also be used in reverse osmosis where a high output resistance is required. To this end, the depth of the outlet manifold 220 and 220A and hence the plenum 290 would be adjusted to be equal to or less than that of the depth of the channels 310, etc. The housing would be constructed of a thick steel sufficient to withstand the high pressures generated inside the container and the membrane material would those recognized in the art. Since high internal pressure would be present, the shims 130, 230, would have to be carefully fit to prevent channeling of the fluid back into the header. The important concept being the adaptability of the present invention to multiple end uses.

Summarizing, the mass transfer device 50 was designed to minimize entrance and exit effects after I discovered that these conditions predominate in determining the efficiency of mass transfer in short path parallel flow devices. The combination of header and manifold designs results in uniform fluid distribution to each plate and along each plate, both from plate end to plate end and from plate side to plate side. While the membrane supports disclosed are grooves, and they are preferred, other geometries such as pyramids or cones can be utilized without departing from the true spirit and scope of the invention. Since the header and manifold designs are the same at both fluid entrances and at both fluid exits, each fluid particle is subjected to the same flow resistance in the device to produce the uniform fluid distribution and flow.

While there has been described what at present is considered to be the preferred embodiment of the present invention, it will be understood that various alterations and modifications may be made therein without departing from the true spirit and scope of the present invention. It is intended to cover all such alterations and modifications in the appended claims.

What is claimed is:

1. A parallel flow device for effecting mass transfer between first and second fluids, said device comprising a first fluid inlet and outlet and a second fluid inlet and outlet, a plurality of plates forming a stack, a membrane positioned between adjacent plates and cooperating therewith to form on opposite sides of each membrane a first fluid channel and a second fluid channel, said first and second fluid inlets and outlets being connected respectively to said first and second fluid channels to introduce fluid into and remove fluid from said channels in a direction coplanar with each of said plates. said membranes being effective to permit mass transfer between a first fluid in said first fluid channels and a second fluid in said fluid channels, manifold means associated with each plate for receiving a first fluid stream from said first fluid inlet and dividing the inlet stream into only two identical streams a plurality of times to provide an even number of streams evenly and uniformly spaced across the plate thereby distributing the first fluid stream transversely across the associated plate at one end of said first fluid channel, manifold means associated with each plate for transporting fluid to said first fluid outlet by evenly and uniformly collecting the first fluid transversely across the associated plate from the other end of said first fluid channel, manifold means associated with each plate for receiving a second fluid stream from said second fluid inlet and dividing the second inlet stream into only two identical streams a plurality of times to provide an even number of streams evenly and uniformly spaced across the plate thereby distributing the second fluid stream transversely across the associated plate at one end of said second fluid channel, and manifold means associated with each plate for transporting fluid to said second fluid outlet by evenly and uniformly collecting the second fluid transversely across the associated plate from the other end of said second fluid channel, each manifold containing the identical even number of branches to provide substantially identical flow resistance through all corresponding branches.

2. The parallel flow device set forth in claim 1, wherein each plate is imperforate in the area contacted by the first or second fluid.

3. The parallel flow device set forth in claim 1, wherein said first fluid inlet and outlet and said secnd fluid inlet and outlet are in fluid communication with said fluid channels at the end edges of each membrane and each plate.

4. The parallel flow device set forth in claim 1, wherein the opposed surfaces of said plates are each provided with a tongue extending longitudinally of said plate at one side edge thereof and a groove extending longitudinally of said plate at the other side edge thereof, said groove on one surface of said plate being in registry with said tongue on the other side of said plate, whereby said plates are easily aligned in a stack of plates with the tongues of one plate being in registry with the grooves of the adjacent plates.

5. A parallel flow device for effecting mass transfer between first and second fluids, said device comprising a first fluid inlet and outlet and a second fluid inlet and outlet, a plurality of plates forming a stack, a membrane positioned between adjacent plates and cooperating therewith to form on opposite sides of each membrane a first fluid channel and a second fluid channel, said membranes being effective to permit mass transfer between a first fluid in said first fluid channels and a second fluid in said second fluid channels, header means interconnecting said first fluid inlet and one end of said first fluid channels for distributing first fluid from said first fluid inlet in a direction perpendicular to the plane of the plates and over an area coextensive with the stack of plates uniformly to each of said first fluid channels, header means interconnecting said first fluid outlet and the other end of said first fluid channels for collecting said first fluid from said first fluid channels, header means interconnecting said second fluid inlet and one end of said second fluid channels for distributing second fluid from said second fluid inlet uniformly to each of said second fluid channels, and header means interconnecting said second fluid outlet and the other end of said second fluid channels for collecting said second fluid from said second fluid channels, each of said header means contining an even number of branches to subdivide the fluid inlet stream received by said header into only two identical streams a plurality of times or to combine two of the fluid streams received from the stack into one fluid outlet stream a plurality of times, each of said header means introducing fluid to or receiving fluid from the end edges of the stack of plates and membranes to distribute and collect fluid without piercing the plates or membranes.

6. The parallel flow device set forth in claim 5, wherein said header means are adhesively connected to the end surfaces of said stack of plates.

7. A parallel flow device for effecting mass transfer between first and second fluids, said device comprising a first fluid inlet and outlet and a second fluid inlet and outlet, a plurality of plates forming a stack, each of said plates having a set of grooves in the surfaces thereof, a membrane positioned between adjacent plates and cooperating with the grooves therein to form on opposite sides of each membrane a first fluid channel and a second fluid channel, said membranes being effective to permit mass transfer between a first fluid in said first fluid channels and a second fluid in said second fluid channels, each of said first and second fluid channels including spaced apart inlet and outlet manifolds near the ends of each of said plates for distributing and collecting fluid transversely across each plate from substantially one side edge to the other side edge by dividing one stream into only two identical streams a plurality of times or by combining two identical streams into one stream a plurality of times, header means interconnecting said first fluid inlet and said first fluid inlet manifolds and having an even number of branches therein to subdivide the fluid inlet stream into identical streams a plurality of times forming a plurality of separate smaller streams for uniformly and evenly distributing first fluid from said first fluid inlet stream in a direction perpendicular to the plane of the plates and over an area coextensive with the end of the stack to each of said first fluid inlet manifolds, header means interconnecting said first fluid outlet and said first fluid outlet manifolds for uniformly and evenly collecting first fluid from said first fluid outlet manifolds by combining two identical streams into one stream a plurality of times, header means interconnecting said second fluid inlet and said second fluid inlet manifolds and having an even number of branches therein to subdivide the fluid inlet stream into identical streams a plurality of times forming a plurality of separte smaller streams for uniformly and evenly distributing second fluid from said second fluid inlet stream in a direction perpendicular to the plane of the plates and over an area coextensive with the end of the stack to each of said second fluid inlet minifolds, header means interconnecting said second fluid outlet and said second fluid outlet manifolds for uniformly and evenly collecting said second fluid from said second fluid outlet manifolds by combining two identical streams into one stream a plurality of times, each of said header means introducing fluid to or receiving fluid from the end edges of the stack of alternate plates and membranes to distribute and collect fluid without piercing the plates or membranes.

8. A parallel flow dialyzer for effecting mass transfer between human blood and a dialysate solution, said dialyser comprising a blood inlet and outlet and a dialysate inlet and outlet, a plurality of plates forming a stack, a semipermeable membrane positioned between adjacent plates and cooperating therewith to form respectively on opposite sides of each membrane a blood channel and a dialysate channel, said semipermeable membranes being effective to permit transfer of impurities in the blood to the dialysate, header means interconnecting said blood inlet and one end of said blood channels for distributing blood uniformly in a direction perpendicular to the planes of the plates and over an area coextensive with the end of the stack of plates from said inlet to each of said blood channels by subdividing blood from said inlet into only two identical streams a plurality of times forming an even number of identical and separate smaller streams each having substantially identical flow resistance in corresponding parts thereof, manifold means in each blood channel for receiving blood from said header and subdividing the blood into two identical streams a plurality of times providing an even number of streams each having substantially identical flow resistance in corresponding parts thereof distributed transversely of said plate across the width thereof, header means interconnecting said blood outlet and the other end of said blood channels for collecting blood from each of said blood channels in a direction perpendicular to the planes of the plates and from an area coextensive with the end of the stack of plates while maintaining uniform flow resistance across said blood channels, header means interconnecting said dialysate inlet and one end of said dialysate channels for distributing dialysate uniformly in a direction perpendicular to the planes of the plates and over an area coextensive with the end of the stack of plates from said inlet to each of said dialysate channels by subdividing dialysate from said inlet into only two identical streams a plurality of times forming an even number of smaller streams each having substantially identical flow resistance in corresponding parts thereof, manifold means in each dialysate channel for receiving dialysate from said header and subdividing the dialysate into two identical streams a plurality of times providing an even number of streams each having substantially identical flow resistance in corresponding parts thereof distributed transversely of said plate across the width thereof, header means interconnecting said dialysate outlet and the other end of said dialysate channels in a direction perpendicular to the planes of the plates and from an area coextensive with the end of the stack of plates for collecting dialysate from each of said dialysate channels while maintaining uniform flow resistance across said dialysate channels.

9. The parallel flow dialyzer set forth in claim 8, wherein said plates and membrane are constructed and arranged to provide about one square meter of membrane area available for dialysis.

10. The parallel flow dialyzer set forth in claim 8, wherein there are 80 blood channels, a pressure drop across the dialyzer at a flow rate of about 300 milliliter per minute of about 42 milliliters Hg. and a priming volume of less than about 90 milliliters.

11. The parallel flow dialyzer set forth in claim 8, wherein each plate has spaced apart longitudinally extending tongue and groove near the side edges thereof and respectively longitudinally extending groove and tongue registry with said tongue and groove on the other surface thereof, cooperation of aligned tongues and grooves of adjacent plates maintaining said membrane in place and under tension.

12. The parallel flow dialyzer set forth in claim 8, wherein each plate is provided with two manifolds near the ends thereof on each surface and membrane supports therebetween.

13. The parallel flow dialyzer set forth in claim 12, wherein said membrane supports are spaced apart grooves on which the associated membrane rests and which form channels through which fluid flows.

14. A rectangular parallel flow dialyzer for effecting mass transfer between human blood and a dialysate solution, said dialyzer comprising a blood inlet and outlet and a dialysate inlet and outlet, each of said inlets and outlets being positioned at the ends of said dialyzer with said blood inlet and dialysate outlet being at one end and said dialysate inlet and said blood outlet being at the other end, the blood and dialysate flow in said inlets and outlets being parallel to the longitudinal dimension of the dialyzer, a plurality of rectangular flat plates forming a stack with each of said plates having grooved manifolds on both surfaces thereof at each end thereof providing four manifolds on each plate, each manifold providing fluid communication between the adjacent end edge of said plate and the central portion of said plate such that a single fluid stream at one end of the manifold at the end edge of the plate is divided into two identical streams a plurality of times and distributed into a plurality of fluid streams at the other end of the manifold with the flow resistance in the manifold being identical for any fluid path therein from the one end to the other end of the manifold, a plurality of grooves on both surfaces of each plate extending between the other ends of said manifolds to provide fluid communication between the end edges on each surface of each plate, a semipermeable membrane positioned between adjacent plates and cooperating therewith to form respectively on opposite sides of each membrane a blood channel and a dialysate channel, said semipermeable membranes being effective to permit transfer of impurities in the blood to the dialysate, header means interconnecting said blood inlet with half of the plate manifolds in fluid connection with the blood channels for uniformly distributing blood from said blood inlet to each of the connected plate manifolds in a direction perpendicular to the plane of the plates and over an area coextensive with the ends of the stack of plates by dividing the blood inlet into two identical streams a plurality of times, header means interconnecting said blood outlet with the other half of the plate manifolds in fluid connection with the blood channels for uniformly collecting blood from each of said connected plate manifolds by combining two identical streams into one stream a plurality of times, header means interconnecting said dialysate inlet with half of the plate manifolds in fluid connection with the dialysate channels for uniformly distributing dialysate from said dialysate inlet to each of the connected plate manifolds in a direction perpendicular to the plane of the plates and over an area coextensive with the ends of the stack of plates by dividing the dialysate inlet into two identical streams a plurality of times, header means interconnecting said dialysate outlet with the other half of the plate manifolds in fluid connection with the dialysate channels for uniformly collecting dialysate from each of said connected plate manifolds by combining two identical streams into one stream a plurality of times, each of said header means introducing fluid to or receiving fluid from the end edges of the stack of plates and the membranes to distribute and collect fluid without piercing the plates or membranes, and means for securely clamping said stack of plates and membranes positioned therebetween and for maintaining separate said blood channels with the associated inlet and outlet from said dialysate channels and the associated inlet and outlet, whereby blood entering said blood inlet is uniformly distributed to each of said connected plate manifolds by the associated header and thereafter uniformly distributed across each plate by the associated manifold to flow along the plurality of grooves to be collected by the associated manifold at the other end of the blood channel and then to be collected by the connected header for removal through said blood outlet while dialysate entering said dialysate inlet is uniformly distributed to each of said connected plate manifolds by the associated header and thereafter uniformly distributed across each plate by the associated manifold to flow along the plurality of grooves to be collected by the associated manifold at the other end of the dialysate channel and then to be collected by the connected header for removal through said dialysate outlet, thereby providing uniform fluid flow for both blood and dialysate through each channel and across each plate resulting in transfer of impurities from the blood across the membranes to the dialysate.

15. A imperforate plate for use in a parallel flow device for effecting mass transfer between first and second fluids, said plate comprising a flat member having opposed surfaces, each surface providing a continuous fluid flow path from one end thereof to the other end thereof for a fluid entering the flow path at said one end and exiting said flow path at the other end thereof, each of said fluid flow paths having an inlet manifold at said one end and an outlet manifold at said other end, said inlet manifolds receiving fluid flowing parallel to the plate side edges and distributing the fluid transversely of said plate substantially from one side edge to the other side edge by dividing one stream into two identical streams a plurality of times thereby subdividing the received fluid into an even number of smaller separate streams each having substantially identical flow resistance in corresponding portions thereof, said outlet manifolds collecting fluid flowing parallel to the plate side edges from substantially one side edge to the other side edge by combining two identical streams into one stream a plurality of times, each of said fluid flow paths having a plurality of elongated grooves forming membrane supports intermediate the associated inlet manifold and the outlet manifold.

16. The plate set forth in claim 15, wherein each of said manifolds includes a plenum extending substantially across said plate from near one side edge to near the other side edge.

17. The plate set forth in claim 16, wherein each of said inlet manifolds continually divides the inlet fluid stream into a plurality of streams which terminate in an associated plenum.

18. The plate set forth in claim 15, wherein said outlet manifolds are the same design or a mirror image of said inlet manifolds.

19. The plate set forth in claim 15, wherein said membrane supports are spaced apart grooves forming fluid channels.

20. The plate set forth in claim 19, wherein said grooves are about 0.1 inch wide and about 0.003 inch deep.

21. The plate set forth in claim 15 wherein said plate is formed of a biocompatible synthetic organic resin and is about 0.02 to about 0.1 centimeter in thickness.

* * * * *

UNITED STATES PATENT AND TRADEMARK OFFICE
CERTIFICATE OF CORRECTION

PATENT NO. : 4,110,220
DATED : August 29, 1978
INVENTOR(S) : Ardis R. Lavender

It is certified that error appears in the above-identified patent and that said Letters Patent are hereby corrected as shown below:

```
Column  1, line 55, "device" should be --devices--.
Column  8, line 14, "extend" should be --extent--.
Column  9, line 57, "ang" should be --and--.
Column 10, line 60, after "the" second occurrence insert -- stack --
Column 13, line 12, "fistual" should be --fistula--;
           line 16, "maxiumum" should be --maximum--;
           line 41, after "0.03" insert --"--;
           line 52, after "0.003" insert --"--;
           line 53, after "120" insert -- 120A --.
           line 54, after "0.003" insert --"--;
           line 56, after "0.006" insert --"--.
Column 15, line 45, after "said" insert --second--.
Column 16, line 8, "secnd" should be --second--.
Column 17, line 27, "separte" should be --separate--;
           line 43, "dialyser" should be --dialyzer--.
Column 18, line 34, "milliliters" should be --millimeters--.
Column 20, line 12, "A" should be --An--.
```

Signed and Sealed this

Tenth Day of April 1979

[SEAL]

Attest:

RUTH C. MASON
Attesting Officer

DONALD W. BANNER
Commissioner of Patents and Trademarks